UNITED STATES PATENT OFFICE 2,328,510

DIHALO-ETHYLENE COPOLYMERIZATION PRODUCT

Charles Allen Thomas, Dayton, Ohio, assignor to Monsanto Chemical Company, St. Louis, Mo., a corporation of Delaware No Drawing. Application July 19, 1940, Serial No. 346,321

24 Claims. (Cl. 260—86)

This invention relates to the products obtained by conjoint polymerization of 1-chloro-1-fluoro-ethylene and at least one other unsaturated, polymerizable organic substance.

One object of this invention is to prepare new polymeric products comprising polymerizing 1-chloro-1-fluoro-ethylene in the presence of at least one other unsaturated, polymerizable organic substance. Another object is to provide conjoint polymers of 1-chloro-1-fluoro-ethylene with at least one other unsaturated, polymerizable organic substance.

Illustrative of the unsaturated, polymerizable organic substances which may be conjointly polymerized with 1-chloro-1-fluoro-ethylene are those substances that contain a vinyl ($CH_2=CH-$) or substituted vinyl

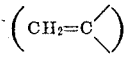

radical. Examples of substances containing a vinyl or substituted vinyl radical, which can be employed according to this invention, are: vinyl esters of lower aliphatic organic acids, such as vinyl acetate and vinyl formate; vinyl halides, such as vinyl chloride; olefine benzenes, such as styrene and alpha methyl styrene; vinyl radical-containing hydrocarbons such as iso-butene and 1,3-butadiene; vinyl or substituted vinyl radical-containing acids and esters thereof, such as acrylic acid, methacrylic acid, methyl methacrylate, ethyl acrylate and ethylene glycol dimethacrylate; esters obtainable by reacting vinyl or substituted vinyl radical-containing alcohols and carboxylic acids, such as allyl acrylate, diallyl maleate, diallyl oxalate, diallyl phthalate, allyl acetate, allyl chloroacetate and allyl crotonate; vinyl ethers, such as methyl vinyl ether; vinyl ketones, such as, methylene ethyl methyl ketone and divinyl ketone.

Co-polymerization of 1-chloro-1-fluoro-ethylene and other polymerizable materials can be accomplished by any convenient means. Catalysts of various types and in varying amounts may be employed. The exact choice of the type and amount of catalyst depends, to some extent, on the proportion and nature of the co-polymerizing substance or substances. The equipment in which the polymerizations can be carried out is that commonly employed for such reactions. However, it is generally desirable to construct the equipment so that it can withstand pressure and so that the reactants come in contact only with such non-corrosive materials as glass or stainless steel. Ordinarily, moderate polymerization temperatures, as for example, between substantially 30° C. and substantially 60° C. are to be preferred.

Co-polymers of widely varying proportions of 1-chloro-1-fluoro-ethylene and other unsaturated, polymerizable organic substances have been found, according to this invention, to possess useful and improved properties. However, generally, the most useful polymers result from the polymerization of a mixture containing substantially 50% or less of 1-chloro-1-fluoro-ethylene.

The following are specific examples of the present invention but are not to be construed as limitative thereof. These polymerization reactions were all carried out under the vapor pressure of the reactants at the particular polymerization temperature employed in closed, glass-lined vessels capable of withstanding pressure. All parts are by weight except where otherwise specified.

The sun lamp test described hereinafter in these specific examples consisted in exposing films of the co-polymers to the rays from a General Electric Company S–1 type mercury vapor sun lamp at a distance of substantially 16 inches for the period of time specified in each case.

The string point test is made by means of a copper melting point bar which in dimension is approximately 2″ x 2″ x 19″. One end of the bar is heated and the other end is cooled by a water coil so that a temperature differential exists along the length of the bar. This is measured by 19 mercury thermometers which are inserted into the bar at intervals of 1″ so that there is a difference between successive thermometers of 6° to 8° C.

In carrying out the test the resin in the form of very small lumps is sprinkled along the length of the bar. After the lumps have been in contact with the bar for 10 minutes, the string point test is made. This is done by pressing lumps of resin at various points along the bar with a steel spatula, and noting whether the resin adheres to both bar and spatula. The temperature of the bar noted as the string point is that temperature of the bar where the lumps, when pressed down by the spatula, adhere to both the bar and the spatula. As a result of this adherence the resin will string out when the spatula is pulled across the bar in a horizontal direction.

*Example 1*

17 parts of 1-chloro-1-fluoro-ethylene and 3 parts of vinyl acetate were conjointly polymerized in the presence of a suitable catalyst, for example, 0.125% by weight of benzoyl peroxide, at a temperature between substantially 40° C. and substantially 50° C. for 20 days. The product was treated with acetone to dissolve the co-polymer, and then, the co-polymer was precipitated from the acetone solution by the addition of water. The precipitated co-polymer, after drying by evacuation at room temperature, was found to amount to 6.45 parts, a yield of 38% based on the amount of monomeric materials employed.

The purified product was slightly brown in color and did not support combustion. A film of this material showed no change in flexibility or color after 240 hours exposure to the sun lamp rays. The string point of this co-polymer was substantially 76° C. and its decomposition point above 162° C. It was soluble in dioxane, benzene, ethyl acetate, chloroform and acetone.

*Example 2*

13 parts of 1-chloro-1-fluoro-ethylene and 13 parts of vinyl acetate were conjointly polymerized in the presence of a suitable catalyst, for example, 0.125% by weight of benzoyl peroxide, at 50° C. for 3 days. 23.9 parts of co-polymer, a yield of 92% based on the amount of monomeric materials employed, was obtained after purification in the same manner as in Example 1.

The product, a white solid, did not support combustion. A film of this material showed no change in flexibility or color after 720 hours exposure to the rays from the sun lamp. The string point of this co-polymer was substantially 90° C. and its decomposition point substantially 160° C. It was soluble in dioxane, benzene, ethyl acetate, acetone and chloroform.

*Example 3*

5 parts of 1-chloro-1-fluoro-ethylene and 20 parts of vinyl acetate were conjointly polymerized in the presence of a suitable catalyst, for example, 0.125% by weight of benzoyl peroxide, at 40° C. for 4 days. 16.75 parts of co-polymer, a yield of 67% based on the amount of monomeric materials employed, was obtained after purification in the same manner as in Example 1.

The product, a white solid, had a slow burning rate. A film of this material was clear and showed no change in color or flexibility after 240 hours exposure to the rays of the sun lamp. The string point of this co-polymer was substantially 100° C. and its decomposition point substantially 189° C. It was soluble in dioxane, benzene, ethyl acetate, acetone and chloroform.

*Example 4*

2 parts of 1-chloro-1-fluoro-ethylene and 38 parts of vinyl acetate were conjointly polymerized in the presence of a suitable catalyst, for example, 0.125% of benzoyl peroxide, at 40° C. for 7 days. 36.4 parts of co-polymer, a yield of 91% based on the amount of monomeric materials employed, was obtained after purification in the same manner as in Example 1.

The product, a white solid, had a slow burning rate. A film of this material was clear and colorless and showed no change after 144 hours exposure to the rays of the sun lamp. The string point of this co-polymer was substantially 105° C. and its decomposition point substantially 196° C. It was soluble in acetone, benzene, dioxane, chloroform and ethyl acetate.

*Example 5*

5 parts of 1-chloro-1-fluoro-ethylene and 45 parts of styrene were conjointly polymerized in the absence of a catalyst at 60° C. for 17 days. The product was treated with benzene to dissolve the co-polymer, and then, the co-polymer was precipitated from the benzene solution by the addition of ethanol. The precipitated co-polymer, after drying by evacuation at room temperature, was found to amount to 34 parts, a yield of 68% based on the amount of monomeric materials employed.

The product, a white solid, had a slow burning rate. A film of this material was clear and colorless and showed no change after 144 hours exposure to the sun lamp rays. The softening point of this co-polymer was 109° C. and the decomposition point above 218° C. It was soluble in dioxane and benzene, ethyl acetate and chloroform.

*Example 6*

5 parts by volume of 1-chloro-1-fluoro-ethylene and 15 parts by volume of vinyl chloride were conjointly polymerized in the presence of a suitable catalyst, for example, 0.2% by weight of acetyl peroxide, at 30° C. for 5 days. A 50% yield by weight of co-polymer, based on the amount of monomeric materials employed, was obtained after purification was carried out as in Example 1.

The product, a white solid, was found to string at substantially 129° C. and to decompose at substantially 175° C. It was swelled by benzene, dioxane, chloroform and ethylene dichloride.

Examples 1, 2, 3, 4, 5 and 6 clearly illustrate the desirable properties of the products obtained by co-polymerizing 1-chloro-1-fluoro-ethylene with other unsaturated, polymerizable organic substances. Further, the products of the present invention prepared as described above soften at moderate temperatures well below their decomposition points, and thus can be worked in various ways without the addition of plasticizing materials.

The new co-polymers in Examples 1, 2, 3, 4 and 5 are seen to be further characterized by an exceptionally high resistance to light so that, in this respect, these new materials tend to be superior to prior halogen-containing polymeric products. Moreover, it is also to be noted that the products in these examples possess, generally, an extremely low burning rate and, in some instances, are entirely non-inflammable. It is obvious that the property of relative non-inflammability is valuable for nearly every use for which such materials are suited, and, thus, these new materials are superior to non-halogen-containing polymeric materials in general, which tend to burn at a relatively rapid rate.

Further usefulness of the products of the present invention is particularly illustrated by the products in Examples 1, 2, 3 and 4. Thus, in contrast to prior halogen-containing polymeric products, in general, these materials are soluble in many common and inexpensive solvents and, thereby, are adapted for use in coating and impregnating compositions. In addition, the products in Examples 3 and 4 have been found to possess an appreciably increased resistance to cold flow under load. For example, when tested at substantially 70° F. and 66% relative humidity, the product in Example 3 exhibited a resistance to cold flow, substantially 20 times greater and the product in Example 4 substantially 5 times greater than the resistance to cold flow of similarly prepared polyvinyl acetate. Among other superior properties of the products in Examples 2, 3 and 4 are high tensile strengths and resistance to flexing. Thus, a film of the product in Example 3 exhibited a tensile strength of substantially 7400 pounds per square inch and, when tested on a Massachusetts Institute of Technology Folding Endurance Tester, manufactured by the Tinius-Olsen Testing Machine Company, Philadelphia, Pennsylvania, was subjected to substantially 33,000 fold cycles before failure.

Particularly illustrative of the novel and useful products of the present invention is the product in Example 3. This copolymer possesses a softening point of substantially 102° C., which is higher than the softening point of similarly prepared polymers of either vinyl acetate or 1-chloro-1-fluoro-ethylene. Thus, similarly prepared polyvinyl acetate, possesses a softening point of substantially 72° C. which is 30° C. lower than that of the product in Example 3. While a relatively low softening point such as that exhibited by polyvinyl acetate is desirable for some purposes it is obvious that, for many purposes, a higher softening point such as that exhibited by the product in Example 3 is decidedly advantageous. Furthermore, it is to be noted that among the products in Examples 1, 2, 3 and 4 those co-polymers containing small amounts of 1-chloro-1-fluoro-ethylene possess higher string points than the co-polymers containing large amounts of 1-chloro-1-fluoro-ethylene.

In general, the per cent by weight of 1-chloro-1-fluoro-ethylene in these co-polymers, as indicated by the fluorine content of the co-polymers, is somewhat lower than the per cent by weight of 1-chloro-1-fluoro-ethylene in the unpolymerized mixture. Thus, the effects produced by the presence of 1-chloro-1-fluoro-ethylene in the co-polymers are the result of an even smaller proportion of 1-chloro-1-fluoro-ethylene than is indicated by the composition of the mixture before polymerization.

This invention is not limited as to such polymerizing conditions as temperature, pressure, type and amount of catalyst or type of polymerization vessel. Examples have been described wherein certain of these reaction conditions have been varied but these variations were given solely for the purpose of illustration. One method of purifying the co-polymers has been given in the examples but it is obvious that other methods may be employed. Furthermore, depending on the use to which the co-polymers are to be placed, the degree of purification is subject to a certain degree of latitude.

The co-polymers prepared according to the present invention are admirably adapted for many uses, as is apparent to those skilled in the art. Thus, these new products may be mixed, rolled, extruded, calendered, molded or otherwise formed singly or in admixture with polymerized or polymerizable materials, fillers, plasticizers, dyes, pigments and the like. If desired, these co-polymers may be employed in solution in suitable solvents singly or in admixture with the various types of added materials cited above and the final product obtained after evaporation of the solvent.

This invention is limited solely by the claims attached hereto.

What is claimed:

1. A polymerization product obtained by co-polymerizing 1-chloro-1-fluoro-ethylene and at least one other unsaturated, polymerizable organic substance having ethylenic unsaturation.

2. A polymerization product obtained by co-polymerizing 1-chloro-1-fluoro-ethylene and a substance containing a radical selected from the group consisting of vinyl

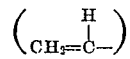

and substituted vinyl

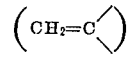

radicals.

3. A polymerization product obtained by co-polymerizing 1-chloro-1-fluoro-ethylene and another unsaturated, polymerizable organic substance having ethylenic unsaturation, in the presence of a polymerization catalyst.

4. A polymerization product obtained by polymerizing in admixture 1-chloro-1-fluoro-ethylene and a substance containing a radical selected from the group consisting of vinyl

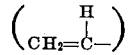

and substituted vinyl

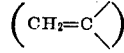

radicals in the presence of an oxygen-containing polymerization catalyst.

5. A co-polymer obtained by subjecting to polymerization conditions a mixture comprising between substantially 5 per cent and substantially 50 per cent by weight of 1-chloro-1-fluoro-ethylene and between substantially 95 per cent and substantially 50 per cent by weight of at least one other substance containing a radical selected from the group consisting of vinyl

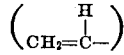

and substituted vinyl

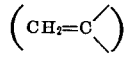

radicals.

6. A polymerization product obtained by polymerizing in admixture 1-chloro-1-fluoro-ethylene and a vinyl ester of a lower aliphatic organic acid.

7. A polymerization product obtained by polymerizing a mixture comprising a minor proportion of 1-chloro-1-fluoro-ethylene and a major proportion of vinyl acetate.

8. A polymerization product obtained by subjecting to polymerization conditions a mixture comprising 1-chloro-1-fluoro-ethylene and a vinyl halide.

9. A polymerization product obtained by co-polymerizing 1-chloro-1-fluoro-ethylene and vinyl chloride.

10. A co-polymer obtained by polymerizing in admixture 1-chloro-1-fluoro-ethylene and an olefine benzene.

11. A polymerization product obtained by co-polymerizing 1-chloro-1-fluoro-ethylene and styrene.

12. The process of preparing a co-polymer comprising treating 1-chloro-1-fluoro-ethylene and at least one other unsaturated, polymerizable substance having ethylenic unsaturation under polymerizing conditions.

13. The process of preparing a co-polymer comprising treating 1-chloro-1-fluoro-ethylene and a substance containing a radical selected from the group consisting of vinyl

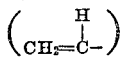

and substituted vinyl

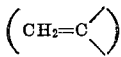

radicals under polymerizing conditions.

14. The process of preparing a polymerization product comprising co-polymerizing 1-chloro-1-fluoro-ethylene and another unsaturated, polymerizable organic substance having ethylenic unsaturation in the presence of a polymerization catalyst.

15. The process of preparing a co-polymer comprising polymerizing in admixture 1-chloro-1-fluoro-ethylene and a substance containing a radical selected from the group consisting of vinyl

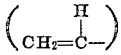

and substituted vinyl

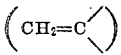

radicals in the presence of an oxygen-containing polymerization catalyst.

16. The process of preparing a co-polymer comprising subjecting to polymerization conditions a mixture comprising between substantially 5 per cent and substantially 50 per cent of 1-chloro-1-fluoro-ethylene and between substantially 95 per cent and substantially 50 per cent of at least one other substance containing a radical selected from the group consisting of vinyl

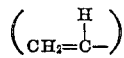

and substituted vinyl

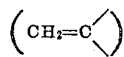

radicals.

17. The process of preparing a co-polymer comprising subjecting to polymerizing conditions 1-chloro-1-fluoro-ethylene and a vinyl ester of a lower aliphatic organic acid.

18. The process of preparing a co-polymer comprising subjecting to polymerizing conditions a mixture comprising a minor proportion of 1-chloro-1-fluoro-ethylene and a major proportion of vinyl acetate.

19. The process of preparing a co-polymer comprising subjecting to polymerization conditions a mixture comprising 1-chloro-1-fluoro-ethylene and a vinyl halide.

20. The process of preparing a co-polymer comprising treating 1-chloro-1-fluoro-ethylene and vinyl chloride under polymerization conditions.

21. The process of preparing a co-polymer comprising treating 1-chloro-1-fluoro-ethylene and an olefine benzene under polymerizing conditions.

22. The process of preparing a co-polymer comprising treating 1-chloro-1-fluoro-ethylene and styrene under polymerizing conditions.

23. A polymerization product, characterized by its adaptation for use in coating and impregnating solutions, obtained by polymerizing a mixture comprising 1-chloro-1-fluoro-ethylene and a vinyl ester of a lower aliphatic organic acid.

24. The process of preparing a co-polymer, characterized by its adaptation for use in coating and impregnating solutions, comprising subjecting to polymerizing conditions 1-chloro-1-fluoro-ethylene and a vinyl ester of a lower aliphatic organic acid.

CHARLES ALLEN THOMAS.